US012632570B1

(12) United States Patent
Tiger et al.

(10) Patent No.: US 12,632,570 B1
(45) Date of Patent: May 19, 2026

(54) GLOBAL APPLICATION CATALOG GENERATION SYSTEM

(71) Applicant: Glow Technology Ltd., Tel Aviv (IL)

(72) Inventors: Roi Tiger, Tel Aviv (IL); Ophir Arie, Herzliya (IL); Omer Singer, Santa Monica, CA (US); Ariel Gabbay, Petah Tikva (IL); Daniel Pollack, Tel Aviv (IL); Jonathan Schifter, Ramat Gan (IL)

(73) Assignee: Glow Technology Ltd., Tel Aviv-Jaffa (IL)

( * ) Notice: Subject to any disclaimer, the term of this patent is extended or adjusted under 35 U.S.C. 154(b) by 0 days.

(21) Appl. No.: 19/388,422

(22) Filed: Nov. 13, 2025

(51) Int. Cl.
*G06F 16/22* (2019.01)
*G06F 16/28* (2019.01)
*G06F 21/57* (2013.01)

(52) U.S. Cl.
CPC ...... *G06F 21/577* (2013.01); *G06F 2221/033* (2013.01)

(58) Field of Classification Search
CPC ........................ G06F 21/577; G06F 2221/033
See application file for complete search history.

(56) References Cited

U.S. PATENT DOCUMENTS

| | | | |
|---|---|---|---|
| 10,095,510 B2 | 10/2018 | Katkere et al. | |
| 10,735,447 B2 * | 8/2020 | Abdulhayoglu | .... H04L 63/1425 |
| 10,937,391 B2 * | 3/2021 | Griswold | ................ G06F 3/011 |
| 11,212,255 B2 * | 12/2021 | Abdulhayoglu | ....... G06F 21/567 |
| 11,991,299 B1 * | 5/2024 | Rosenoer | .................. H04L 9/50 |
| 12,511,388 B1 * | 12/2025 | Kulkarni | ............... G06F 21/566 |
| 2017/0004305 A1 * | 1/2017 | Zakorzhevsky | ...... G06F 21/567 |
| 2018/0232921 A1 * | 8/2018 | Smith | ................ G06Q 30/0201 |
| 2022/0345537 A1 * | 10/2022 | Samms | .................. H04L 67/535 |
| 2023/0153150 A1 * | 5/2023 | Kozlowski | .............. H04L 63/20 |
| | | | 718/108 |
| 2023/0156569 A1 * | 5/2023 | Breaux, III | ........... H04W 12/08 |
| | | | 381/86 |
| 2025/0363085 A1 * | 11/2025 | Tishbi | ................. G06F 16/2282 |

\* cited by examiner

*Primary Examiner* — Mohammad A Siddiqi
(74) *Attorney, Agent, or Firm* — M&B IP Analysts, LLC

(57) ABSTRACT

A system and method for generating a software product component catalog for endpoint security is presented. The method includes receiving data on endpoint usage of software product components, wherein the data on endpoint usage includes information on states of software product components; invoking at least one AI agent and external data sources based on the data on endpoint usage, wherein the external data sources are invokable by the at least one AI agent to extract particular types of attributes of the software product components; extracting, by the at least one AI agent using external data sources, attributes of the software product components, wherein attributes are dynamic qualities of a software product component; verifying the extracted attributes of the software product components using at least a language model, heuristics, and a combination thereof; and generating an endpoint security policy based, in part, on the verified attributes.

21 Claims, 6 Drawing Sheets

400

S410
Receive data on endpoint usage

S420
Invoke an AI agent and external data sources to extract attributes of software product components S430
Extract attributes of software product components S440
Verify the extracted attributes S450
Generate an endpoint security based, in part, on the verified extracted attributes

400

S410

Receive data on endpoint usage

S420

Invoke an AI agent and external data sources to extract attributes of software product components

S430

Extract attributes of software product components

S440

Verify the extracted attributes

S450

Generate an endpoint security based, in part, on the verified extracted attributes

500

S510

Receive a request to extract an attribute

S520

NO

New type of attribute requested?

S530

Extract attributes of software product components

YES

S540

NO

Extraction requires new tool?

YES

S550

Invoke a new AI agent

S560

Add a new tool invokable by an AI agent

GLOBAL APPLICATION CATALOG GENERATION SYSTEM

TECHNICAL FIELD

The present disclosure relates generally to cybersecurity technologies and, more specifically, to cataloging software product components installed on endpoints.

BACKGROUND

Enterprise organizations traditionally rely on several categories of tools in order to keep an inventory of software applications and identify outdated or malicious software. One common approach has been patch management systems. These solutions connect to an endpoint environment, scan for software applications and their versions, and report when versions are out of date. In order to provide such information, these solutions rely on knowing which applications exist, which versions are available worldwide, and which ones are installed locally. Some solutions depend on manually updated databases, where security teams download patches or vendors supply updates, and the solution updates records accordingly. Some solutions are limited to updating bases using deterministic methods. These solutions create an inherent lag and restrict the scope of applications covered.

Additionally, other solutions use endpoint agents to upload raw data about executables and processes to an organization's cloud service. By correlating file hashes with known programs, these solutions (e.g., ThreatLocker®) inform organizations about what software is installed. These solutions, however, are limited to only a few hundred applications and rely on security teams to manually monitor applications, download new installers, and add their hashes to the database.

Furthermore, some traditional solutions (e.g., VirusTotal® of Google® Threat Intelligence) allow users to upload a file or hash and receive results from multiple scanners about whether the file is malware. These solutions serve to identify threats but fail to provide a comprehensive, dynamic inventory of applications.

These traditional solutions are limited in scope, with inventories often capped at hundreds of applications rather than thousands. The solutions also require significant human effort to keep data up to date. The solutions often rely on vendor agreements or manual monitoring. The solutions do not scale to the large and changing space of applications, installers, and versions found across modern organizations. Additionally, much of the underlying information is unstructured. For example, common vulnerabilities and exposures (CVEs) are published with textual descriptions that require interpretation, names of publishers appear in inconsistent forms such as, "Spotify AB" versus "Spotify Inc.," and suites of applications are not labeled uniformly. This fuzziness makes it difficult to match data automatically. As a result, current solutions are slow to adapt, incomplete, and unable to deliver the level of automation and precision needed.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include receiving data on endpoint usage of software product components, where the data on endpoint usage includes information on states of software product components. The method may also include invoking at least one AI agent and external data sources based on the data on endpoint usage, where the external data sources are invokable by the at least one AI agent to extract particular types of attributes of the software product components. The method may furthermore include extracting, by the at least one AI agent using external data sources, attributes of the software product components, where attributes are dynamic qualities of a software product component. The method may in addition include verifying the extracted attributes of the software product components using at least a language model, heuristics, and a combination thereof. The method may moreover include generating an endpoint security policy based, in part, on the verified attributes. Other embodiments of this aspect include corresponding computer systems, apparatus, and computer programs recorded on one or more computer storage devices, each configured to perform the actions of the methods.

Implementations may include one or more of the following features. The method may include: when a new type of attribute is requested, invoking at least one new AI agent configured to extract the new type of attribute. The method may include: when a new type of attribute is requested, adding a new external data source invokable by the at least one AI agent, where the new external data source allows the at least one AI agent to extract the new type of attribute. The method may include: when a software product component is an opaque software application installer, launching, by the at least one AI agent, an isolated virtual machine in which to execute the installer; generating, by the at least one AI agent, a pre-installation snapshot of the isolated machine before the installer is executed; executing, by the at least one AI agent, the installer in the isolated virtual machine; generating, by the at least one AI agent, a post-installation snapshot of the isolated machine after the installer is executed; recording, by the at least one AI agent, changes in the isolated virtual machine, where the changes include at least files, file paths, hashes, types, and registry modifications. The method where a software product component of the plurality of software product components is any one of: a desktop application, mobile application, browser extension, a browser-based session, integrated development environment (IDE) plug-in, other software plug-in, command-line tool, portable application, background service, scheduled task, script, virtual appliance, containerized application, firmware utility, opaque software application installer, and running process. The method where an attribute of a software product component is any one of: CVEs, hashes of executables, file paths, registry entries, vendor homepage information, categories, known exploits, and backup behaviors. The method where verifying the extracted attributes of the software product components using at least a large language model (LLM) and heuristics further may include: generating candidate matches for the extracted attributes; prompting the language model with a prompt that includes at least the generated matches; and executing the prompt by the LLM to confirm the candidate matches are accurate. The method may include: invoking a plurality of AI agents to analyze each extracted attribute; and filtering results of the analysis of the plurality of AI agents to include only attributes that are verified. The method where an endpoint security policy defines at least access permissions for endpoint devices based on endpoint usage rules defined for at least software product components, user roles, and various usage contexts. The method where extracting, by the at least one AI agent using external data sources, attributes of the software product components, further may include: receiving, by at least one AI agent, names of states of software product components in the data on endpoint usage; and determining, by the at least one AI agent using external data sources, when the received names of states are attributable to a same software product entity. The method may include verifying the extracted attributes based on the data on endpoint usage. Implementations of the described techniques may include hardware, a method or process, or a computer tangible medium.

In one general aspect, a non-transitory computer-readable medium may include one or more instructions that, when executed by one or more processors of a device, cause the device to: receive data on endpoint usage of software product components, where the data on endpoint usage includes information on states of software product components; invoke at least one AI agent and external data sources based on the data on endpoint usage, where the external data sources are invokable by the at least one AI agent to extract particular types of attributes of the software product components; extract, by the at least one AI agent using external data sources, attributes of the software product components, where attributes are dynamic qualities of a software product component; verify the extracted attributes of the software product components using at least a language model, heuristics, and a combination thereof; and generate an endpoint security policy based, in part, on the verified attributes. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: receive data on endpoint usage of software product components, where the data on endpoint usage includes information on states of software product components. The system may in addition include invoke at least one AI agent and external data sources based on the data on endpoint usage, where the external data sources are invokable by the at least one AI agent to extract particular types of attributes of the software product components. The system may moreover include extract, by the at least one AI agent using external data sources, attributes of the software product components, where attributes are dynamic qualities of a software product component. The system may also include verify the extracted attributes of the software product components using at least a language model, heuristics, and a combination thereof. The system may furthermore include generate an endpoint security policy based, in part, on the verified attributes. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: when a new type of attribute is requested, invoke at least one new AI agent configured to extract the new type of attribute. The system where the memory contains further instructions which when executed by the processing circuitry further configure the system to: when a new type of attribute is requested, add a new external data source invokable by the at least one AI agent, where the new external data source allows at least one AI agent to extract the new type of attribute. The system where the memory contains further instructions which when executed by the processing circuitry further configure the system to: when a software product component is an opaque software application installer, launch, by the at least one AI agent, an isolated virtual machine in which to execute the installer; generate, by the at least one AI agent, a pre-installation snapshot of the isolated machine before the installer is executed; execute, by the at least one AI agent, the installer in the isolated virtual machine; generate, by the at least one AI agent, a post-installation snapshot of the isolated machine after the installer is executed; and record, by the at least one AI agent, changes in the isolated virtual machine, where the changes include at least files, file paths, hashes, types, and registry modifications. The system where a software product component of the plurality of software product components is any one of: a desktop application, mobile application, browser extension, a browser-based session, integrated development environment (IDE) plug-in, other software plug-in, command-line tool, portable application, background service, scheduled task, script, virtual appliance, containerized application, firmware utility, opaque software application installer, and running process. The system where an attribute of a software product component is any one of: CVEs, hashes of executables, file paths, registry entries, vendor homepage information, categories, known exploits, and backup behaviors. The system where the memory contains further instructions that, when executed by the processing circuitry for verifying the extracted attributes of the software product components using at least a large language model (LLM) and heuristics, further configure the system to: generate candidate matches for the extracted attributes; prompt the language model with a prompt that includes at least the generated matches; and execute the prompt by the LLM to confirm the candidate matches are accurate. The system where the memory contains further instructions which when executed by the processing circuitry further configure the system to: invoke a plurality of AI agents to analyze each extracted attribute; and filter results of the analysis of the plurality of AI agents to include only attributes that are verified. The system where an endpoint security policy defines at least access permissions for endpoint devices based on endpoint usage rules defined for at least software product components, user roles, and various usage contexts. The system where the memory contains further instructions that, when executed by the processing circuitry for extracting, by the at least one AI agent using external data sources, attributes of the software product components, further configure the system to: receive, by at least one AI agent, names of states of software product components in the data on endpoint usage; and determine, by the at least one AI agent using external data sources, when the received names of states are attributable to a same software product entity. The system where the memory contains further instructions which when executed by the processing circuitry further configure the system to: verify the extracted attributes based on the data on endpoint usage. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
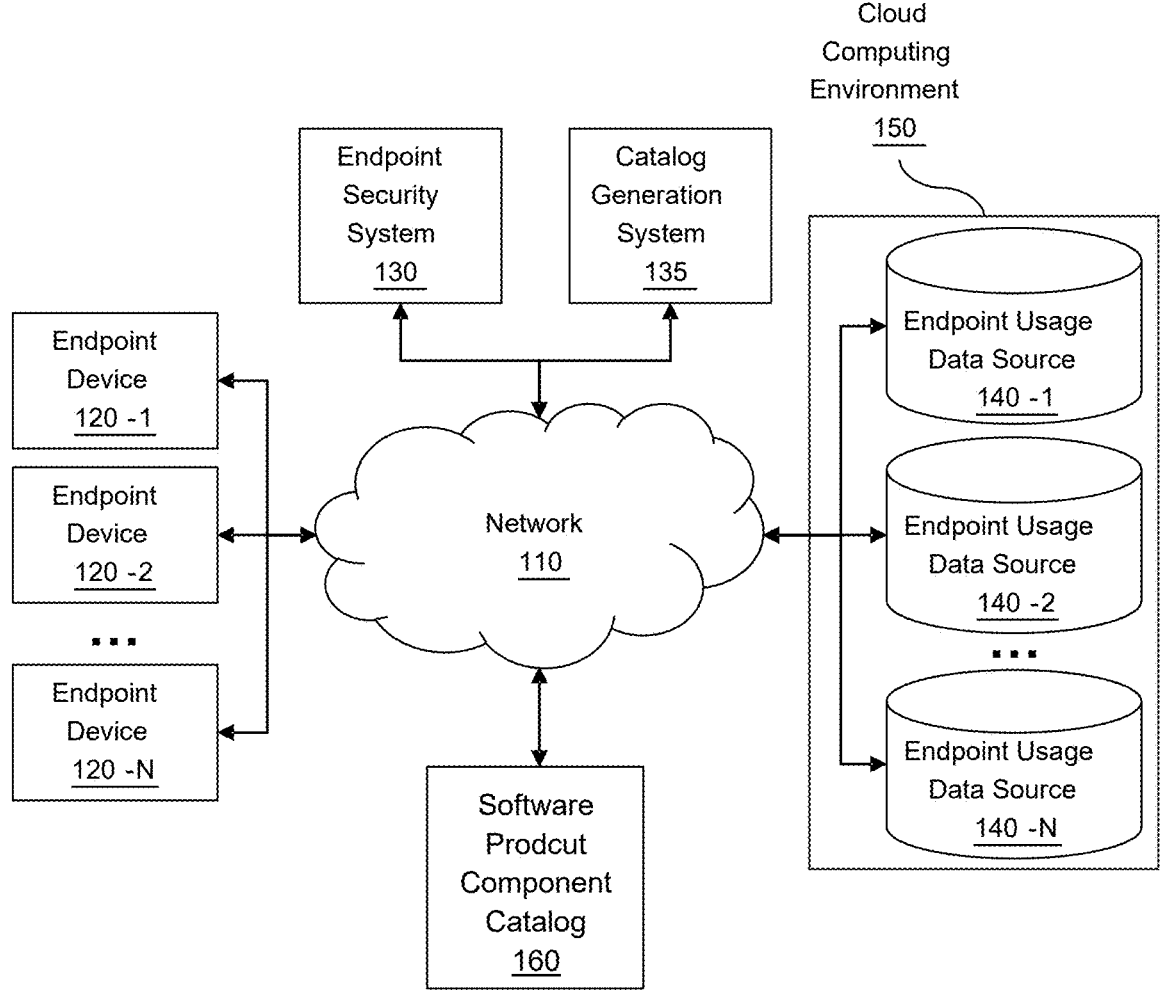
FIG. 1 shows an example network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed method and system include creating and maintaining a dynamic application inventory through the use of AI-driven and heuristic agents. The disclosed method and system include the dynamic use of tools configured to proactively search, extract, and verify information. The disclosed method and system populate the inventory on demand when a software product component (as defined and described in more detail herein) first appears in client data, while allowing pre-population for common software product components where appropriate. The disclosed method and system support an open and extendable set of attributes, including, but not limited to, CVEs, file hashes, registry entries, file paths, vendor information, categories, known exploits, backup behaviors, and AI data-sharing behaviors.

Additionally, the disclosed method and system employ multiple independent AI agents and sources for each attribute to ensure accurate results by filtering results through both heuristic rules and LLM-based checks. The disclosed method and system store accepted results in a cache memory that forms part of the evolving inventory, while retaining the capacity to invoke additional agents or tools when new attributes or requirements arise (e.g., when a required value is missing).

Furthermore, the disclosed method and system implement an AI agent that executes installers inside an isolated virtual machine, carries out the installation process step by step, and records the difference between the machine state before and after the installation. The disclosed method and system thereby obtain detailed outputs, including files, file hashes, registry changes, and network activity, which cannot practically be derived by static inspection of such installers.

As used herein, the term "software product component" is intended to be construed in a non-limiting manner and may include, but is not limited to, a desktop software application, a mobile application, a browser extension, a browser-based session, an integrated development environment (IDE) plug-in, other software plug-in, a command-line tool, a portable application, a background service, a scheduled task, a script, a virtual appliance, a containerized application, a firmware utility, a running process, combinations thereof, and other functionally similar software implementations or equivalents executed on a physical machine or virtual machine.

It should be understood that the number of endpoint devices in use in modern enterprises is massive, the volume of interactions of the endpoint devices with systems and various software product components is high, the variety of software product components and subcomponents is large, and the volume of security logs, telemetry data, and the like (hereinafter, data on endpoint usage) generated based on interactions is high. Additionally, it should be noted that installers, files, hashes, vulnerability references (e.g., CVEs), and other attributes of software product components are dynamic, context-dependent, and unstructured. Due to these conditions, the operations described herein cannot be performed using the human mind or by performing the operation using paper and pencil.

Moreover, a human operator applies subjective criteria to extract various types of attributes of software product components, leading to inconsistent results between different human operators and often between the same human performing the same task repeatedly, particularly at the speeds required to provide an operable solution. Further, the human mind cannot practically perform the operations in the human mind or with pencil and paper as the operations disclosed involve real-time ingestion of a massive amount of logs, data, and contextual information as well as artificial intelligence (AI) techniques such as Retrieval-Augmented Generation (RAG), prompt engineering, and using a trained language model to generate endpoint security policies which the human mind is not capable of performing practically.

FIG. 1 shows an example network diagram 100 utilized to describe the various disclosed embodiments. In the example network diagram 100, endpoint devices 120-1 through 120-N, wherein N is an integer greater than 1 (hereinafter, endpoint device 120 in the singular and endpoint devices 120 in the plural), an endpoint security system 130, endpoint usage data sources 140-1 through 140-N, where N is an integer greater than 1 (hereinafter, endpoint usage data source 140 in the singular and endpoint usage data sources 140 in the plural), cloud computing environment 150, catalog generation system 135, and software product component catalog 160 communicate via a network 110. Network 110 may be, but is not limited to, a wireless, cellular or wired network, a local area network (LAN), a wide area network (WAN), a metro area network (MAN), the Internet, the worldwide web (WWW), similar networks, and any combination thereof.

Endpoint device 120 may be a physical or virtual device that includes, but is not limited to, a server, a personal computer, a laptop, a tablet computer, a smartphone, a wearable computing device, or any other device capable of sending and receiving data. Endpoint devices 120 are capable of communicating with and accessing data from an organization's storage systems (not shown). When endpoint devices 120 interact (e.g., send and receive data) with an organization's storage systems, data on endpoint usage is generated and stored in various endpoint usage data sources 140. Data on endpoint usage may include, but is not limited to, log data. Log data refers to structured records generated by systems, applications, and security tools that document events relevant to security operations, such as authentication attempts, access control decisions, process executions, network connections, system changes, a combination thereof, and the like. Log data also refers to information on system and application state, including, but not limited to, performance metrics, configuration changes, usage patterns, and behavioral signals. It should be noted that the disclosed embodiments are not limited to receiving log data.

Endpoint usage data sources 140 are configured to monitor usage of endpoint devices 120. Endpoint usage data sources 140 are configured to, in some embodiments, record and store data related to network traffic and other communication between various endpoint devices 140 and between endpoint devices 140 and various storage systems. In some embodiments, endpoint usage data sources 140 are configured to store data on at least endpoint device states, roles of users of endpoint devices, and software product components used by endpoint devices. In some embodiments, endpoint usage data sources 140 are configured to install an agent onto each endpoint device 120, where the agent is further configured to collect data for ingestion by the endpoint usage data sources 140. Examples of endpoint usage data sources 140 include, but are not limited to, mobile device management (MDM) tools, Security Information and Event Management (SIEM) tools, endpoint detection and response (EDR) tools, Identity Provider (IDP) tools, security data lakes, and the like. It should be noted that the endpoint usage data sources 140 may store data on a software product component using heterogeneous naming conventions.

In an embodiment, endpoint usage data sources 140 are deployed in a cloud computing environment 150. The cloud computing environment 150 may include a public cloud, a private cloud, and a hybrid cloud. Examples of a cloud computing environment 150 may include Amazon Web Services®, Microsoft Azure®, Google Cloud Platform®, IBM Cloud®, Oracle Cloud®, VMware Cloud®, and the like. Endpoint usage data sources 140 may be hosted in two or more different cloud computing environments 150. In some embodiments, endpoint usage data sources 140 are stored on-premises of an organization.

In some embodiments, catalog generation system 135 receives data on endpoint usage of software product components. Data on endpoint usage of software product components includes, but is not limited to, unstructured log data, network traffic telemetry, browser traffic telemetry, a combination thereof, and the like. The data includes information on states of software product components, including application names, version strings, publisher names, executable file hashes, and processes. Software product components include, but are not limited to, desktop applications, mobile applications, browser extensions, integrated development environment plug-ins, other software plug-ins, command-line tools, portable applications, background services, scheduled tasks, scripts, virtual appliances, containerized applications, firmware utilities, running processes, a combination thereof, and the like. Catalog generation system 135 is configured to access external sources (described in more detail herein) to generate the software product component catalog 160.

Catalog generation system 135 is further configured to extract attributes of software product components. Attributes are dynamic qualities of a software product component and include, but are not limited to, CVEs, hashes of executables, file paths, registry entries, vendor homepage information, categories, known exploits, and backup behaviors. Attributes are not static qualities of a software product component but change with time, circumstance, and context. New attributes of a software product component may be requested to be extracted, such as, but not limited to, whether a software product component makes regular backups to the cloud and whether a software product component provides AI-generated suggestions that may involve the use of a third-party generative AI service. This is explained in more detail herein. Additionally, the catalog generation system 135 to verify the extracted attributes using both an LLM and heuristic checks.

Heuristic checks (including heuristics, heuristic logic, or heuristic rules) rule-based techniques employed by the catalog generation system 135 to verify outputs of AI agents without relying solely on probabilistic reasoning or machine learning models. Heuristics are applied to determine whether an extracted attribute is accurate by checking for deterministic matches or conditions that are indicative of correctness. For example, when a vendor homepage is identified by an AI agent, a heuristic may be applied to fetch the candidate webpage and search for the publisher's name in the copyright footer or privacy policy. The publisher string is then compared to the observed publisher name from the data. As another example, when an installer file is retrieved, a heuristic may involve calculating its hash and comparing it against known values derived from repositories or archives. As an additional example, when a CVE description is returned, a heuristic may involve checking whether the program name or version string appears in the CVE text in a normalized form (e.g., ignoring "Inc.," "Ltd.," or regional suffixes).

Catalog generation system 135 is configured to apply a precision-first policy, where results are compared and only high-confidence outputs are retained. As used herein, precision-first policy refers to embodiments where the disclosed method and system prioritize correctness of results over completeness of results. In a precision-first policy, the system is configured to filter out uncertain outputs, potentially erroneous outputs, a combination thereof, and the like produced by AI agents, large language models, or heuristics, even when doing so also excludes some correct outputs. Using this precision-first policy, the information retained and stored in the catalog is highly reliable, with minimal false positives. Such verification is explained in more detail herein.

In some embodiments, catalog generation system 135 is configured to utilize human feedback as part of a retrieval-augmented generation (RAG) process to augment the information from the software product component catalog 160 to increase the accuracy of information used to generate endpoint security policies.

Software product component catalog 160 is a dynamic, structured repository that dynamically aggregates detailed metadata about software product components and the like which is essential for contextual security evaluation that serves as a source of enrichment for endpoint security policy generation. Data and/or metadata can be aggregated on a software product component, and can be aggregated upon installation of the software product component. Each entry in the software product component catalog 160 includes an indexed record of the software product components, enriched with associated threat intelligence and a range of scores representing security posture, operational features, and overall quality of each software product component.

In some embodiments, software product component catalog 160 may be realized by organizing data according to a defined schema and metadata framework that enforces consistency and enables efficient retrieval. In one implementation, information can be stored in a relational or graph-based database, with documents or records associated through controlled vocabularies, ontologies, or key relationships. Metadata elements (e.g., identifiers, timestamps, classifications) may be applied to each stored item, allowing the repository to support structured queries, semantic search, and advanced analytics. The catalog 160 may further include governance mechanisms such as access control, versioning, and validation to ensure integrity, as well as integration components for interoperability with external systems. In this way, the structured repository provides a systematic, queryable, and extensible environment for managing complex information.

In some embodiments, dynamic cybersecurity risk profiles are generated and stored in software product component catalog 160. Dynamic cybersecurity risk profiles are computed based on global properties of each software product component and contextual properties of each software product component. Global properties refer to at least general risk information on each software product component, and contextual properties refer to at least in-context risk information on each software product component. Inputs used to generate such dynamic cybersecurity risk profiles include, but are not limited to, static and behavioral analysis, vulnerability exposure, publisher reputation, and compliance with industry standards. In some embodiments, generating dynamic cybersecurity risk profiles includes computing a global risk score of each software product component based on at least the global properties, computing at least one contextual risk score for each software product component based on the contextual properties, and aggregating the global risk score and the at least one contextual risk score into the dynamic cybersecurity risk profile. The at least one contextual risk score is computed for a particular usage of each software product component. Computing multiple contextual risk scores for a variety of usage contexts provides granular detail for the dynamic cybersecurity risk profile based on varying risk for different user roles and in different contexts. In some embodiments, the dynamic cybersecurity risk profile is updated based on new cyberthreat intelligence data.

In some embodiments, threat intelligence associated with each software product component is derived from continuously ingested feeds that monitor indicators of compromise, exploit availability, malware associations, anomalous behavior patterns observed across trusted telemetry sources, and the like. In additional embodiments, software product component catalog 160 is configured with information on the popularity of usage of the software product components. The software product component catalog 160 is configured to undergo continual (e.g., real-time, near real-time, and the like) updates as new intelligence surfaces, ensuring that assessments of software product components remain current.

Endpoint security system 130 is configured to generate an endpoint security policy based on the received data. In some embodiments, endpoint security system 130 is configured to use an AI process (e.g., RAG) to augment the context from which endpoint security policies are generated using information from the software product component catalog 160. In some embodiments, generated endpoint security policies are configured to be stored on the endpoint devices 120. In one embodiment, the stored endpoint security policies are enforced using existing EDR tools, Mobile Device Management (MDM) tools, an optional AI agent, a combination thereof, or the like. In some embodiments, endpoint security system 130 is configured to optionally install an agent on the endpoint device 120 to perform the enforcement actions. It should be noted that such an agent is not configured to generate the endpoint security policies.

The particular configuration depicted in FIG. 1 is an example only. For example, while each of the systems is represented as separate in FIG. 1, in some embodiments, one or more of the systems may be implemented using the same hardware, software, virtual machine, or the like. Furthermore, while each of the systems is represented as a single entity in FIG. 1, in some embodiments, each such system may include one or more entities.

Furthermore, endpoint security system 130 and catalog generation system 135 can be realized as a physical machine (example of which is discussed below), a virtual machine, or a combination thereof. An example diagram of a physical machine implementation is shown below. A virtual machine can be implemented as any virtual instance, a software container, a microservice, and the like. Endpoint security system 130 can be deployed in a cloud computing environment or on-premises.

Figure 2:
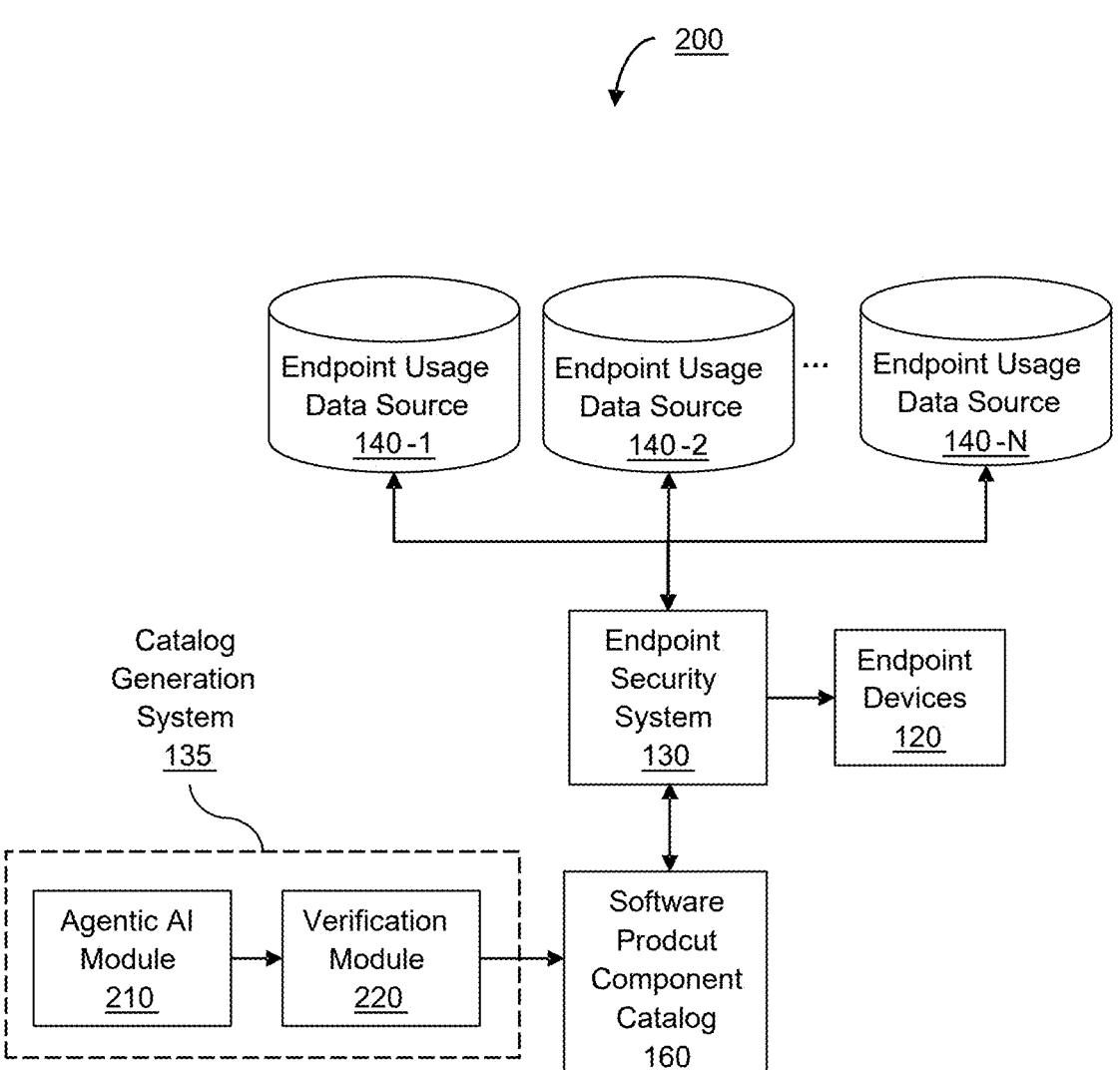
FIG. 2 is a functional flow diagram illustrating a method for endpoint security policy generation using an AI-generated dynamically updated software product component catalog according to an embodiment.

FIG. 2 is a functional flow diagram 200 illustrating a method for endpoint security policy generation using an AI-generated dynamically-updated software product component catalog according to an embodiment.

Data on endpoint usage are received from endpoint usage data sources 140 by endpoint security system 130. As an example, data may be received from Endpoint Detection and Response (EDR) solutions like Microsoft Defender for Endpoint®, antivirus or anti-malware software with cloud integration (e.g., McAfee®), Cloud-based Mobile Device Management (MDM) platforms like Intune®, Cloud access security brokers (CASBs), Cloud-hosted VPN or Zero Trust Network Access (ZTNA) clients, Web filtering and proxy services like Cisco Umbrella®, and the like. In some embodiments, endpoint security system 130 is configured to connect (e.g., over a network) to endpoint usage data sources 140 to retrieve data through an Application Programming Interface (API), and the like.

Additionally, in some embodiments, endpoint security system 130 is configured to generate a prompt for an LLM, where the prompt includes at least a prompt template, a constraint, an instruction, and the retrieved data. In some embodiments, the prompt is enriched with information from the software product component catalog 160 using various AI techniques including, but not limited to, Retrieval-Augmented Generation.

Catalog generation system 135 is configured to generate the contents of the software product component catalog 160. Catalog generation system 135 includes agentic AI module 210 and verification module 220.

Agentic AI module 210 is configured to receive data on endpoint usage of software product components. The data includes information on states of software product components, including application names, version strings, publisher names, executable file hashes, and processes. Additionally, agentic AI module 210 is configured to access external data sources (described in more detail herein) to generate the software product component catalog 160.

Catalog generation system 135 is configured to invoke certain AI agents of the agentic AI module 210 that are configured to handle attributes of a particular type, as well as certain data sources invocable by the AI agents that are configured to assist the AI agents in extracting the attributes of software product components.

Agentic AI module 210 is further configured to extract attributes of software product components from the data on endpoint usage. Attributes are dynamic qualities of a software product component and include, but are not limited to, CVEs, hashes of executables, file paths, registry entries, vendor homepage information, categories, known exploits, and backup behaviors. Attributes are not static qualities of a software product component but change with time, circumstance, and context. New attributes of a software product component may be requested to be extracted, such as, but not limited to, whether a software product component makes regular backups to the cloud and whether a software product component provides AI-generated suggestions that may involve the use of a third-party generative AI service.

In some embodiments, when extracting attributes of a software product component, agentic AI module 210 is further configured to recognize heterogeneous naming conventions of the same software product and unify the heterogeneous naming conventions of the same software product under a single product identity within the software product component catalog 160. Because such data are collected using heterogeneous naming conventions, it is frequently unclear that two or more recorded entries refer to the same software product. Agentic AI module 210 is configured to resolve this heterogeneity by determining when multiple states of a software product component correspond to a single underlying software product, such as when both a desktop application and a web application represent the same Software-as-a-Service (SaaS) product.

In some embodiments, agentic AI module 210 is configured to recognize that a software product may manifest as multiple software product components. The agentic AI module 210 is configured to determine that these heterogeneous software product components collectively represent the same product by correlating data across multiple data sources invokable by the agentic AI module 210. For example, agentic AI module 210 is configured to determine that "Slack (desktop)" and "slack.com" accessed through a browser are manifestations of the same Slack product and therefore unify them under a single catalog entry for policy enforcement.

In certain embodiments, catalog generation system 135 is configured to perform multistage entity resolution to determine whether two or more reported software product components correspond to the same product. The resolution process may involve deterministic normalization of names and publishers, such as removal of suffixes or regional identifiers, followed by statistical or machine learning techniques to handle more ambiguous variants. When deterministic and learned techniques are insufficient, agentic AI module 210 is configured to perform external searches, retrieve contextual information from data sources, and evaluate whether distinct entries represent the same product. This process may be applied to resolve cases where an application appears with unrelated publisher strings or is bundled by third-party frameworks. For instance, when Cursor® IDE has publishers "Cursor Inc.," "Hilary Stout," and "toDesktop," agentic AI module 210 is configured to employ the described multi-stage entity resolution process to determine that all three publishers correspond to the same Cursor software product.

Verification module 220 is configured to receive the attributes extracted by the agentic AI module 210. Verification module 220 is configured to verify the extracted attributes from the agentic analysis using an LLM, heuristic checks, a combination thereof, and the like. In some embodiments, verification module 220 is configured to verify the attributes by generating candidate matches for attributes; formatting a prompt with instructions, constraints, and candidate data; and executing the prompt by the LLM to confirm accuracy. In some embodiments, heuristic verification is further configured to be utilized by the verification module 220, including string matching of publisher names from webpage footers or privacy policies against original publisher names.

In some embodiments, verification module 220 is configured to utilize a precision-first policy, where attributes extracted from different AI agents are compared and only high-confidence outputs are retained. In some embodiments, verifying, by the verification module 220, the extracted attributes of the software product components using at least a large language model (LLM) and heuristics includes invoking a plurality of AI agents to analyze each extracted attribute and filtering results of the analysis of the plurality of AI agents to include only attributes that are verified.

It should be noted that the selective invocation of an AI agent and external data sources results in more efficient computer processing because of the reduction in the number of computation operations required to perform extraction. Through the selective invocation of particular subsets of AI agents and corresponding subsets of external data sources when extracting attributes of software product components, only those AI agents configured to handle that attribute type are executed, and only those external data sources relevant to that attribute type are accessed. Thus, not all AI agents are invoked indiscriminately, and not all external data sources are searched for every attribute, saving on computation operations and improving the functioning of a computer system by organizing processing in a selective manner.

Agentic AI module 210 and verification module 220 are discussed in more detail hereinbelow.

Figure 3:
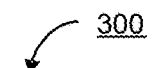
FIG. 3 is a block diagram of a system for generating a software product component catalog for endpoint security according to an embodiment.
Figure 3:
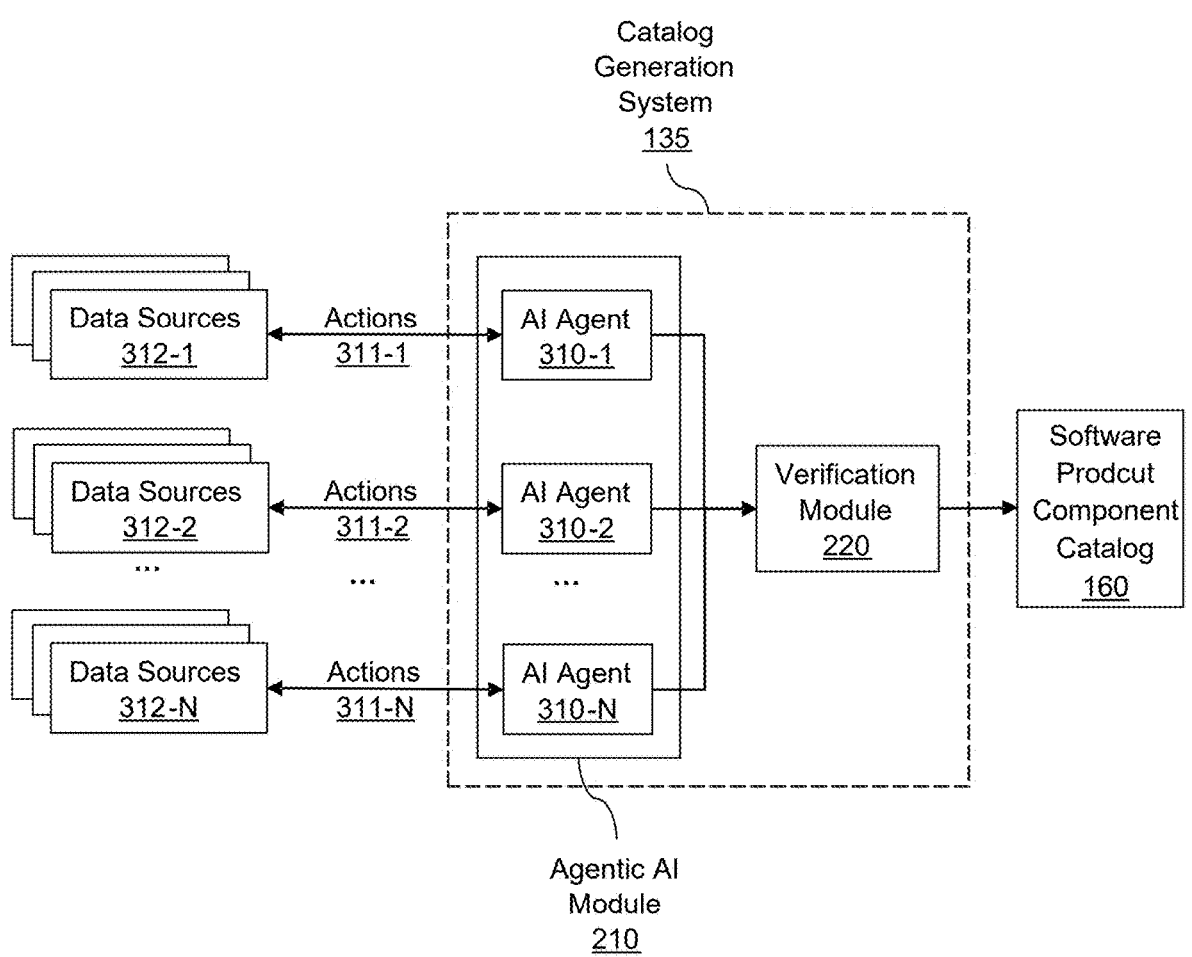

FIG. 3 is a block diagram of a system for generating a software product component catalog for endpoint security according to an embodiment.

As explained above in FIG. 2, catalog generation system 135 includes an agentic AI module 210 and a verification module 220. The agentic AI module 210 is configured with AI agent 310-1 through 310-N, where N is an integer greater than 1 (hereinafter, AI agent 310 in the singular or AI agents 310 in the plural). AI agents 310 are configured to perform actions 311-1 through 311-N, where N is an integer greater than 1 (hereinafter, action 311 in the singular or actions 311 in the plural) including, but not limited to, searching and analyzing attributes. AI agents 310 are configured to perform actions 311 using data sources 312-1 through 312-N, where N is an integer greater than 1. For example, data sources 312-1 may be invoked by one or AI agents 310-1, data sources 312-2 may be invoked by AI agent 310-2, and so on, where each AI agent 310 is configured to access corresponding data sources 312. In some embodiments, data sources 312 may be invoked by different AI agents 310 (e.g., AI agent 310-1 and AI agent 310-2), where some of the same data sources 312 are invokable by the different AI agents 310.

Agentic AI module 210 is configured to receive data on endpoint usage of software product components. The data includes information on states of software product components, including application names, version strings, publisher names, executable file hashes, and processes.

AI agents 310 that are configured to extract particular types of attributes of software product components are invoked in agentic AI module 210. Additionally, data sources 312 invocable through actions 311 by AI agents 310 are configured to assist AI agents 310 in extracting attributes of the particular type that the AI agents 310 are configured to extract. The particular types of attributes of software product components to be extracted are determined based on the data on endpoint usage.

AI agents 310 of the agentic AI module 210 are configured to extract attributes of software product components. Attributes are dynamic qualities of a software product component and include, but are not limited to, CVEs, hashes of executables, file paths, registry entries, vendor homepage information, categories, known exploits, and backup behaviors. Attributes are not static qualities of a software product component but change with time, circumstance, and context. New attributes of a software product component may be requested to be extracted such as, but not limited to, whether a software product component makes regular backups to the cloud and whether a software product component provides AI-generated suggestions that may involve the use of a third-party generative AI service.

In some embodiments, the extraction of attributes of the software product components is performed by the AI agent 310 invoked by the agentic AI module 210. The AI agent 310 is configured to extract the particular types of attributes using actions 311 (e.g., tool calls) to external data sources 312 that are also configured to be invoked by the AI agent to assist in the extraction of the particular types of attributes.

In some embodiments, extracting attributes further includes normalizing an application name or publisher name (e.g., removing corporate suffixes like "Inc.", handling aliases such as "Spotify AB" versus "Spotify Inc.", a combination thereof, and the like), isolating an observed hash for matching, capturing an installer reference, a combination thereof, and the like. Agentic AI module 210 is configured to resolve heterogeneous naming conventions by determining when multiple different names of states of a software product component correspond to a single underlying software product, as explained above. It should be noted that the selective invocation of an AI agent and external data sources results in more efficient computer processing because of the reduction in the number of computation operations required to perform extraction. Through the selective invocation of particular subsets of AI agents and corresponding subsets of external data sources when extracting attributes of software product components, only those AI agents configured to handle that attribute type are executed, and only those external data sources relevant to that attribute type are accessed. Thus, not all AI agents are invoked indiscriminately, and not all external data sources are searched for every attribute, saving on computation operations and improving the functioning of a computer system by organizing processing in a selective manner.

For example, when a target attribute is a CVE associated with a software product component, only the AI agents configured for vulnerability analysis, such as those programmed to query cve.org and parse CVE descriptions are invoked. Other agents, such as those responsible for installer analysis or vendor homepage verification, are not invoked. Similarly, when a target attribute is a file hash, only those AI agents capable of retrieving or deriving hashes, such as AI agents that search vendor download pages, repositories, archives, and the like are invoked. By contrast, agents related to vulnerabilities or categories are not executed in this case.

In some embodiments, there may be a separate parsing module (not shown) of catalog generation system 130 that parses the attributes of a software product component to determine what AI agent 310 is configured with the instructions, the access to data sources 312, and the like to extract particular types of attributes parsed by the parsing module. In some embodiments, the parsing module is configured to determine a type of an attribute, which enables certain AI agents 310 to be deployed that are configured to extract attributes of the particular type identified by the parsing module.

Some examples of actions 311 include, but are not limited to, querying data sources 312 such as, but not limited to, cve.org to retrieve CVE records, performing a web search to identify a vendor homepage, parsing a vendor's download page for hashes, retrieving installer packages from repositories, submitting a file hash to VirusTotal®, a combination thereof, and the like. In some embodiments, when the attribute involves installer analysis, an AI agent 310 is configured to statically extract files and hashes from archive installers. In other embodiments, when the attribute involves an opaque installer, AI agent 310 is configured to dynamically execute the installer inside an isolated virtual machine. In the dynamic execution embodiment, an AI-driven procedure is configured to operate the installation, and a snapshot comparison of the virtual machine before and after installation is performed to capture files created, registry modifications, and network activity.

The outputs produced by AI agents 310 are transmitted from agentic AI module 210 to verification module 220. Verification module 220 is configured to verify the extracted attributes using an LLM, heuristic checks, a combination thereof, and the like. In some embodiments, verification module 220 is configured to verify the extracted attributes by generating candidate matches for attributes; formatting a prompt with instructions, constraints, and candidate data; and executing the prompt by the LLM to confirm accuracy. In some embodiments, heuristic verification is further configured to be utilized by verification module 220, including string matching of publisher names from webpage footers or privacy policies against original publisher names.

In some embodiments, verification module 220 is configured to utilize a precision-first policy, where results from multiple AI agents 310 and multiple data sources 312 are compared and only high-confidence outputs are retained. In some embodiments, verifying, by the verification module 220, the extracted attributes of the software product components using at least a large language model (LLM) and heuristics includes invoking a plurality of AI agents to analyze each extracted attribute and filtering results of the analysis of the plurality of AI agents to include only attributes that are verified.

The verified attributes from verification module 220 are returned to agentic AI module 210, which is configured to store the verified extracted attributes in a software product component catalog. In some embodiments, a separate module (not shown) is configured to store the verified attributes in the software product component catalog 160. In some embodiments, software product component catalog 160 functions as a cache, accumulating verified CVEs, hashes, registry entries, vendor data, and related attributes so that subsequent queries may be resolved without repeated analysis, thus increasing efficiency of computer processing. Endpoint security system 130 is configured to access the contents of the software product component catalog to generate endpoint security policies based, in part, on the verified attributes stored in the software product component catalog 160.

The interconnection between the agentic AI module 210 and verification module 220 is configured to ensure that attributes extracted by AI agents 310 through actions 311 on data sources 312 are validated before entry into the software product component catalog 160, and that the software product component catalog 160 serves as a dynamically-updated source for generating accurate endpoint security policies.

It should be noted that agentic AI module and/or AI agents may be realized as a computational component implemented in hardware, software, or a combination thereof, that is configured to perform one or more machine learning, reasoning, or decision-making functions. The AI module may include trained models, algorithms, or rule-based engines that process input data and generate inferences, predictions, classifications, or actions based on such input. The AI module may operate independently or in conjunction with other modules, and may be adaptable through training, retraining, or parameter updates. In certain implementations, the AI module can incorporate neural networks, statistical models, or heuristic logic, and may interface with data repositories, sensors, or external systems to improve performance and accuracy.

Figure 4:
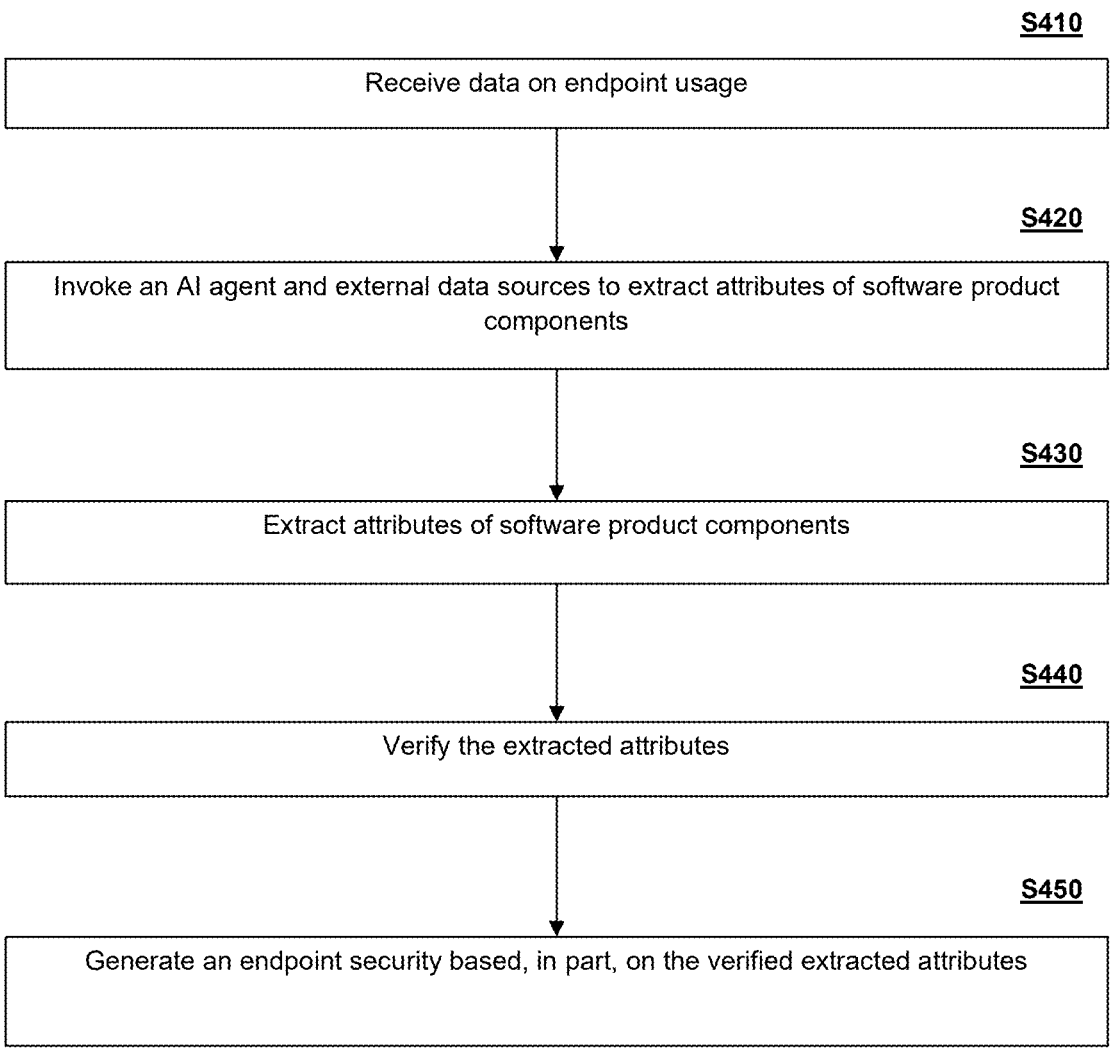
FIG. 4 is an example flowchart illustrating a method for generating endpoint security policies according to an embodiment.

FIG. 4 is an example flowchart 400 illustrating a method for generating endpoint security policies according to an embodiment. In an embodiment, the method is performed by endpoint security system 130, FIG. 1.

At S410, data on endpoint usage of software product components is received. The data on endpoint usage includes information on states of software product components. For example, a software product component may include an application name and version string. In some embodiments, a publisher name may be observed in the data on endpoint usage. In some embodiments, the data includes process identifiers and executable file hashes. An example includes a log record indicating use of Slack® with a version string; another example includes a process entry for a Chrome® installer.

At S420, an AI agent and external data sources are invoked based on the data on endpoint usage. The AI agent and external data sources are invoked based on particular types of attributes of software product components that the AI agent is configured to extract using the external data sources that are configured to be invoked by the AI agent to assist in the extraction of the particular types of attributes. The particular types of attributes of software product components to be extracted are determined based on the data on the endpoint usage.

At S430, attributes of software product components are extracted. As mentioned above, attributes are dynamic qualities of a software product component. Attributes include, but are not limited to, CVEs, hashes of executables, file paths, registry entries, vendor homepage information, categories, known exploits, and backup behaviors.

In some embodiments, extracting attributes of the software product components is performed by the AI agent (invoked at S420) that is configured to extract the particular types of attributes using external data sources (invoked at S420) that are also configured to be invoked by the AI agent to assist in the extraction of the particular types of attributes.

In some embodiments, extracting attributes further includes normalizing an application name or publisher name (e.g., removing corporate suffixes like "Inc.", handling aliases such as "Spotify AB" versus "Spotify Inc.", a combination thereof, and the like), isolating an observed hash for matching, capturing an installer reference, a combination thereof, and the like. As mentioned above, such data on endpoint usage have heterogeneous naming conventions, it is frequently unclear that two or more recorded entries refer to the same software product. As such, normalizing an application name or publisher may involve determining when multiple states of a software product component correspond to a single underlying software product. For example, data on endpoint usage of Cursor® IDE software product component may include different publisher names such as "Cursor Inc.," "Hilary Stout," and "toDesktop," across different data sources. The ability the resolve different naming conventions and different software product components as attributable software product, allows for greater completeness and accuracy of data on software products to be generated and stored in software product component catalog 160.

In some embodiments, S430 may include causing an AI agent to invoke an external data source (e.g., a tool) to query cve.org to identify CVEs matching the named software product component. In another example embodiment, an AI agent that locates and validates a vendor homepage via web search and page retrieval. Additionally, an AI agent may obtain executable or installer hashes from multiple independent sources, such as a vendor download page, the Homebrew® package repository on macOS®, archives, or VirusTotal® (Google Threat Intelligence).

For software installers that have simple archives (e.g., MSI), static extraction may be performed to enumerate files and hashes. For opaque installers (e.g., custom EXE), analysis may be performed by executing the installer inside an isolated virtual machine using an AI-driven computer-use procedure and comparing a pre-installation state of the isolated virtual machine and a post-installation state of the isolated virtual machine to identify files written, registry modifications, and any network activity (e.g., the Chrome® installer obtaining a secondary installer), as described in more detail herein.

It should be noted that the selective invocation (at S420) of an AI agent and external data sources results in more efficient computer processing because of the reduction in the number of computation operations required to perform extraction. Through the selective invocation of particular subsets of AI agents and corresponding subsets of external data sources when extracting attributes of software product components, only those AI agents configured to handle that attribute type are executed, and only those external data sources relevant to that attribute type are accessed. Thus, not all AI agents are invoked indiscriminately, and not all external data sources are searched for every attribute, saving on computation operations and improving the functioning of a computer system by organizing processing in a selective manner.

For example, when a target attribute is a CVE associated with a software product component, only the AI agents configured for vulnerability analysis, such as those programmed to query cve.org and parse CVE descriptions, are invoked. Other agents, such as those responsible for installer analysis or vendor homepage verification, are not invoked. Similarly, when a target attribute is a file hash, only those AI agents capable of retrieving or deriving hashes, such as AI agents that search vendor download pages, repositories, archives, and the like are invoked. By contrast, agents related to vulnerabilities or categories are not executed in this case.

At S440, the extracted attributes are verified using at least a language model or a large language model (LLM) and/or heuristics. In some embodiments, verifying extracted attributes involves generating candidate matches for the extracted attributes; prompting the LLM with a prompt that includes at least an instruction, a constraint, a prompt template, and the candidate matches; and executing the prompt by the LLM to confirm the candidate matches are accurate. In some embodiments, heuristic-based verification includes, but is not limited to, fetching the candidate vendor webpage and checking the footer or privacy policy for a publisher string that is compared to the observed publisher name, with string-matching used to accept or reject the candidate match. It should be noted that, in some embodiments, the verification is used as part of a precision-first policy where AI agents invoke multiple sources to analyze the same attribute and only high-confidence outputs are retained.

In some embodiments, the verified extracted attributes are stored in a software product component catalog. In some embodiments, storing the verified extracted attributes are used to enrich a prompt for an LLM, where the LLM is configured to execute the prompt to generate accurate endpoint security policies based on tenant's log data and the content of the software product component catalog. In some embodiments, the software product component catalog may be realized as a cache storage, inventory, a combination thereof, and the like that accrues verified attributes of software product components, including, but not limited to, CVEs, hashes, paths, registry entries, and validated vendor information for later reuse so that repeated analysis is avoided, increasing the efficiency of computer processing.

At S450, an endpoint security policy is generated based, in part, on the verified attributes of software product components. Generating an endpoint security policy is supported by the extracted and verified attributes (e.g., further stored in software product component catalog).

Although FIG. 4 shows example blocks of flowchart 400, in some implementations, flowchart 400 may include additional blocks, fewer blocks, different blocks, or differently arranged blocks than those depicted in FIG. 4. Additionally, or alternatively, two or more of the blocks of flowchart 400 may be performed in parallel.

Figure 5:
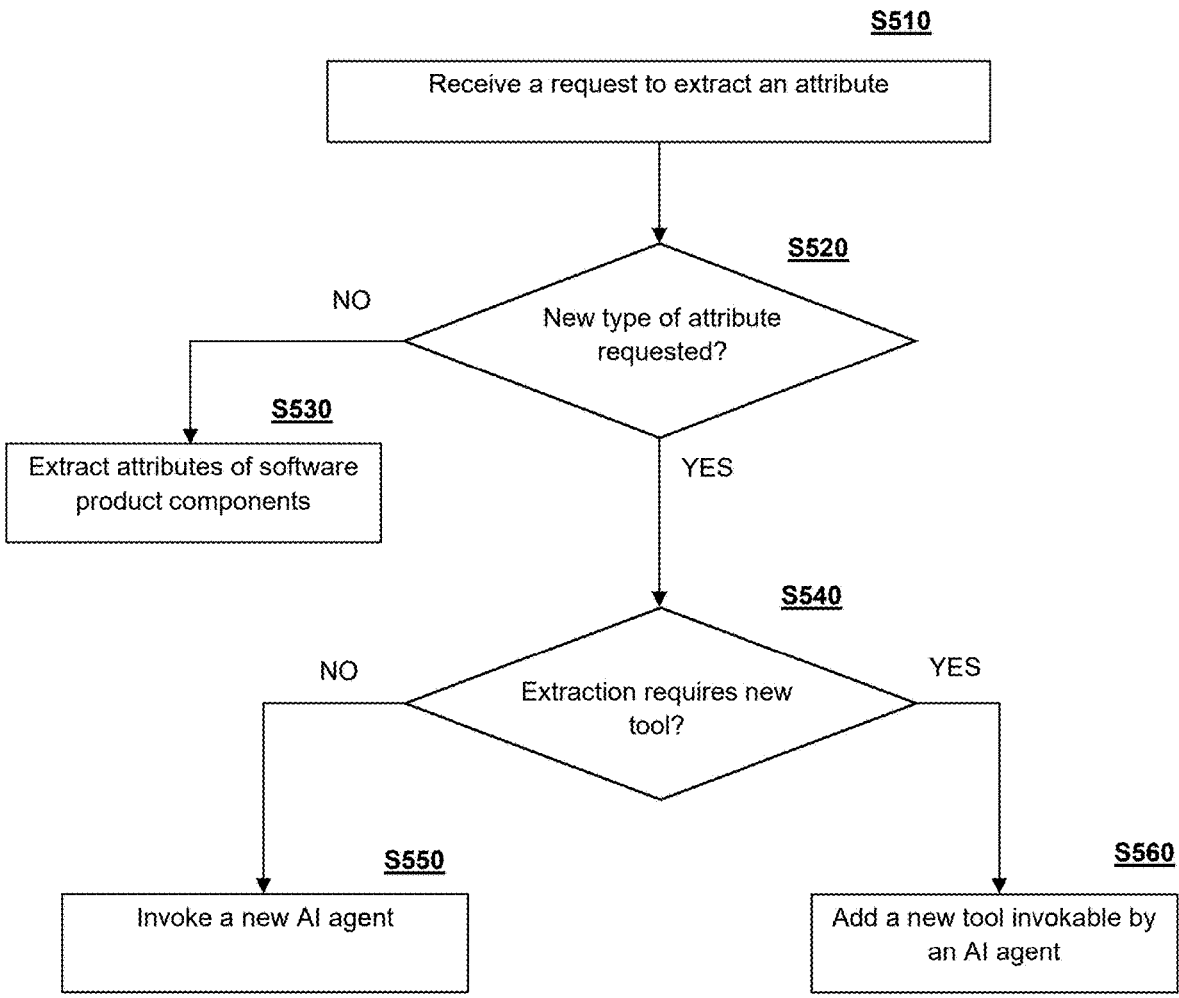
FIG. 5 is an example flowchart of a method for systematically extracting new attributes of software product components for the accurate generation of endpoint security policies according to an embodiment.

FIG. 5 is an example flowchart 500 of a method for systematically extracting new attributes of software product components for the accurate generation of endpoint security policies according to an embodiment. In an embodiment, the method is performed by catalog generation system 135, FIG. 1.

At S510, a request to extract an attribute is received. As explained above, attributes are dynamic qualities of a software product component, and examples include CVEs, hashes of executables, file paths, registry entries, vendor homepage information, categories, known exploits, and backup behaviors.

In some embodiments, a request may be directed to attributes such as, but not limited to, whether a software product component connects to backup services, whether it provides AI suggestions that may involve data sharing, whether a particular software installer corresponds to specific registry modifications, and the like. The received request indicates the need for the catalog generation system 135, FIG. 1 to expand the stored information confirm missing data, and the like.

At S520, it is determined whether a new type of attribute is requested. If NO, execution proceeds with S530. If YES, execution proceeds with S540.

A new type of attribute refers to a class of information about a software product component that has not previously been defined or extracted (e.g., by the catalog generation system 135). For example, while CVEs and hashes may already be supported, a new request may involve tracking whether a software component transmits data to an AI provider or whether the software product component creates specific categories of cloud storage connections.

According to this embodiment, the catalog generation system 135, FIG. 1, is able to dynamically adapt to new requirements. This enables organizations to quickly configure new tools (hereinafter, data sources or tools) or AI agents (as explained below) for emerging needs and ensures that future extractions of the same attribute type can be performed systematically.

At S530, attributes of software product components are extracted. In some embodiments, extracting attributes further includes normalizing an application name or publisher name (e.g., removing corporate suffixes like "Inc.", handling aliases such as "Spotify AB" versus "Spotify Inc.", a combination thereof, and the like), isolating an observed hash for matching, capturing an installer reference, a combination thereof, and the like.

At S540, it is determined whether extraction requires a new tool. If NO, execution proceeds with S550. If YES, execution proceeds with S560. For example, a new attribute such as a vendor homepage may not require a new tool if existing search and verification mechanisms suffice. However, a new attribute that involves complex installer analysis may require the addition of a tool that enables a virtual machine-based installation process, as described in more detail herein (e.g., at S560).

At S550, a new AI agent is invoked. The new AI agent is configured with the instructions, prompts, tools, and the like necessary to perform the requested extraction.

Invoking this new AI agent enables the catalog generation system 135 to handle future extractions of the same attribute type systematically using the new AI agent.

At S560, a new tool that is invokable by an AI agent is added. Adding a new tool involves providing an agent with the capability to extract and analyze the new type of attribute when invoking the tool. In some embodiments, selecting a new tool to be added is based on the type of attribute identified as requiring extraction. In one embodiment, when the attribute involves vulnerabilities such as CVEs, the new tool may be a parser configured to interface with structured or semi-structured vulnerability repositories so that the AI agent can directly extract CVE numbers, descriptions, and affected versions. In another embodiment, when the attribute involves vendor homepage information, the new tool may be a crawler configured to search for and retrieve candidate websites and to extract identifying elements, such as publisher strings, from page footers or privacy policies for subsequent verification. In yet another embodiment, when the attribute involves executable hashes, the new tool may be a downloader configured to obtain installer files from vendor repositories, package managers, or archives and to calculate file hashes that can be attributed to the application.

In each above embodiments, the tool is selected for addition because the previously available set of tools is insufficient to support accurate extraction of the requested attribute, and the new tool equips the AI agent with the required capability.

For example, a new tool invokable by the AI agent may include the ability of the AI agent to use an isolated virtual machine to install a software installer and track the changes produced by the software installer. In this embodiment, when a software product component is an opaque software application installer, an isolated virtual machine is launched by the AI agent to execute the installer. A pre-installation snapshot of the isolated machine is generated by the AI agent before the installer is executed. The AI agent is then configured to execute the installer within the isolated virtual machine. A post-installation snapshot of the machine is generated by the AI agent after execution. The changes recorded, by the AI agent, between the pre-installation and post-installation snapshots include, but are not limited to, files, file paths, hashes, types, and registry modifications. By recording these changes, the system can accurately attribute the installed components to the software, and such information becomes part of the catalog for generating endpoint security policies.

In an embodiment, the virtual machine-based analysis discussed herein may be used to execute not only the specific installer variant observed in a client's endpoint log but also additional installers corresponding to other versions or platforms of the same application. This embodiment addresses the difficulty described in managing scale, where each application may have multiple installers, multiple hashes, and multiple versions that would otherwise be impractical to analyze manually.

According to this embodiment, the AI agent is further configured to identify and execute additional installer variants for the same application are identified, even if those variants have not yet been seen in endpoint logs. For example, installers for Windows®, macOS®, and Linux® platforms may be obtained (e.g., from the vendor's website, from repositories, from archives, a combination thereof, and the like). Installers for older or newer versions may also be retrieved by the AI agent. Each installer variant is then executed by the AI agent in a corresponding virtual machine environment appropriate for its platform. In some embodiments, the same pre- and post-installation snapshot process is performed for each installer.

The result is that a single observation of an application in a client environment can trigger a much broader analysis. The catalog generation system is thereby able to associate multiple hashes, registry entries, and network behaviors with the same application family. This ensures that when future variants of the application are encountered, they are already covered by the catalog. The process may also be performed proactively, with no prior log entry, by selecting applications of interest and retrieving their installers in advance for virtual machine-based analysis.

Through this embodiment, the catalog generation system extends its visibility beyond the specific artifacts first observed. By analyzing several different installers across versions and platforms, the system ensures that the long tail of application variants is systematically incorporated into the catalog, thereby enhancing accuracy and breadth of endpoint security policies derived from the catalog.

An embodiment of the method of FIG. 5 may be illustrated through the handling of a request to extract attributes from a lesser-known software product component, such as the application DeepSeek. Unlike widely deployed enterprise software such as Slack® or Chrome®, DeepSeek represents a long-tail application that organizations may encounter sporadically but that can present unknown risks if not cataloged properly.

A request is received to determine the installation changes and behavioral attributes of the DeepSeek installer. The request specifies that information is needed regarding files created, registry entries modified, and potential network communications initiated during installation. Because this type of attribute has not previously been defined for the application, this is identified as a new attribute type that must be handled dynamically. The ability to support such requests allows the catalog generation system 135 to adapt to the unpredictable variety of lesser-known software that can appear in client environments.

In some embodiments, it is determined that the requested extraction requires a new tool. The catalog generation system 135 introduces a virtual machine-based analysis tool that can be invoked by an AI agent. The tool launches an isolated virtual machine in which the DeepSeek installer is executed. A pre-installation snapshot of the virtual machine is generated, and the AI agent is instructed to carry out the installation by following the installer dialogs, installing all available product components, and avoiding any purchase or external confirmation actions. A post-installation snapshot is then generated.

The system records the differences between the pre- and post-installation states of the isolated virtual machine. In this example, installation of DeepSeek results in the creation of multiple executables with associated hashes, modifications to registry keys governing startup behavior, and the addition of files to non-standard directories. Network activity is also recorded, revealing that the installer attempts to contact an external server during setup. These results are verified through heuristic checks and by prompting an LLM with structured instructions to confirm that the captured outputs correspond to the DeepSeek application.

Once verified, the installation-change attribute for DeepSeek is added to the software product component catalog 160. The newly introduced virtual machine tool remains available for use with other opaque or lesser-known installers. As a result, when future long-tail applications are encountered, the catalog generation system can systematically capture their installation behavior without manual, case-by-case intervention.

Although FIG. 5 shows example blocks of flowchart 500, in some implementations, flowchart 500 may include additional blocks, fewer blocks, different blocks, or differently arranged blocks than those depicted in FIG. 5. Additionally, or alternatively, two or more of the blocks of flowchart 500 may be performed in parallel.

Figure 6:
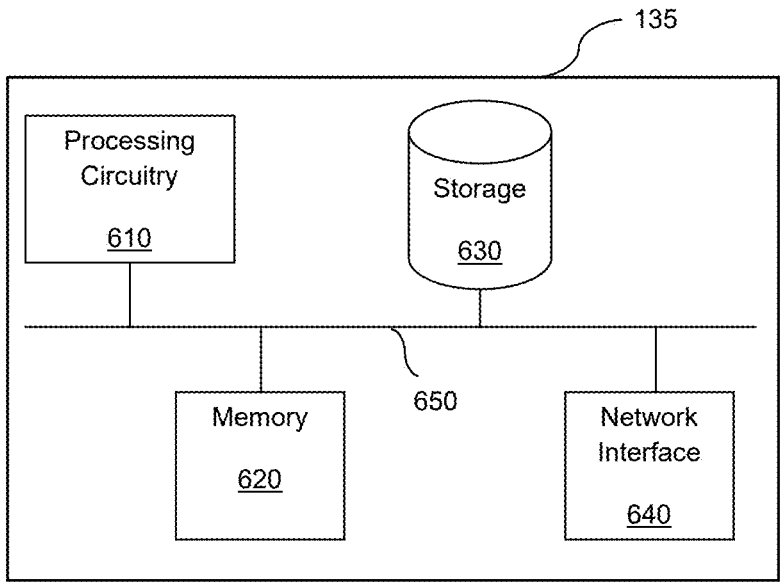
FIG. 6 is an example schematic diagram of a catalog generation system according to an embodiment.

FIG. 6 is an example schematic diagram of a catalog generation system 135 according to an embodiment. The catalog generation system 135 includes a processing circuitry 610 coupled to a memory 620, a storage 630, and a network interface 640. In an embodiment, the components of the endpoint security system 130 may be communicatively connected via a bus 650. In some embodiments, FIG. 6 may an example schematic diagram of endpoint security system 130.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In at least some embodiments, the processing circuitry 610 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 610 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 610 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 610 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 610 may include a number of CPU cores which is equal to or greater than the number of GPUs in order to facilitate or otherwise support parallel processing via multiple GPUs.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the catalog generation system 135 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a software product component catalog for endpoint security, comprising:

receiving data on endpoint usage of software product components, wherein the data on endpoint usage includes information on states of the software product components;

invoking at least one (artificial intelligence) AI agent and external data sources based on the data on endpoint usage, wherein the external data sources are invokable by the at least one AI agent to extract particular types of attributes of the software product components;

extracting, by the at least one AI agent using external data sources, attributes of the software product components, wherein attributes are dynamic qualities of a software product component;

when a software product component is an opaque software application installer, launching, by the at least one AI agent, an isolated virtual machine in which to execute the installer;

generating, by the at least one AI agent, a pre-installation snapshot of the isolated machine before the installer is executed;

executing, by the at least one AI agent, the installer in the isolated virtual machine;

generating, by the at least one AI agent, a post-installation snapshot of the isolated machine after the installer is executed;

recording, by the at least one AI agent, changes in the isolated virtual machine, wherein the changes include at least files, file paths, hashes, types, and registry modifications;

verifying the extracted attributes of the software product components using at least a language model, heuristics, and a combination thereof; and generating an endpoint security policy based, in part, on the verified attributes.

2. The method of claim 1, further comprising:

when a new type of attribute is requested, invoking at least one new AI agent configured to extract the new type of attribute.

3. The method of claim 1, further comprising:

when a new type of attribute is requested, adding a new external data source invokable by the at least one AI agent, wherein the new external data source allows the at least one AI agent to extract the new type of attribute.

4. The method of claim 1, wherein a software product component is any one of: a desktop application, mobile application, browser extension, a browser-based session, integrated development environment (IDE) plug-in, other software plug-in, command-line tool, portable application, background service, scheduled task, script, virtual appliance, containerized application, firmware utility, opaque software application installer, and running process.

5. The method of claim 1, wherein an attribute of a software product component is any one of: CVEs, hashes of executables, file paths, registry entries, vendor homepage information, categories, known exploits, and backup behaviors.

6. The method of claim 1, wherein verifying the extracted attributes of the software product components using at least a large language model (LLM) and heuristics further comprises:

generating candidate matches for the extracted attributes;

prompting the language model with a prompt that includes at least the generated matches; and executing the prompt by the LLM to confirm the candidate matches are accurate.

7. The method of claim 1, further comprising:

invoking a plurality of AI agents to analyze each extracted attribute analyzing, by the plurality of AI agents, each extracted attribute; and filtering results of the analysis by the plurality of AI agents to include only attributes that are verified.

8. The method of claim 1, wherein an endpoint security policy defines at least access permissions for endpoint devices based on endpoint usage rules defined for at least software product components, user roles, and various usage contexts.

9. The method of claim 1, wherein extracting, by the at least one AI agent using external data sources, attributes of the software product components, further comprises:

receiving, by at least one AI agent, names of states of software product components in the data on endpoint usage; and determining, by the at least one AI agent using external data sources, when the received names of states are attributable to a same software product entity.

10. The method of claim 1, further comprising verifying the extracted attributes based on the data on endpoint usage.

11. A non-transitory computer-readable medium storing a set of instructions for generating a software product component catalog for endpoint security, the set of instructions comprising:

one or more instructions that, when executed by one or more processors of a device, cause the device to:

receive data on endpoint usage of software product components, wherein the data on endpoint usage includes information on states of the software product components;

invoke at least one (artificial intelligence) AI agent and external data sources based on the data on endpoint usage, wherein the external data sources are invokable by the at least one AI agent to extract particular types of attributes of the software product components;

extract, by the at least one AI agent using external data sources, attributes of the software product components, wherein attributes are dynamic qualities of a software product component;

when a software product component is an opaque software application installer, launch, by the at least one AI agent, an isolated virtual machine in which to execute the installer;

generate, by the at least one AI agent, a pre-installation snapshot of the isolated machine before the installer is executed;

execute, by the at least one AI agent, the installer in the isolated virtual machine;

generate, by the at least one AI agent, a post-installation snapshot of the isolated machine after the installer is executed;

record, by the at least one AI agent, changes in the isolated virtual machine, wherein the changes include at least files, file paths, hashes, types, and registry modifications;

verify the extracted attributes of the software product components using at least a language model, heuristics, and a combination thereof; and generate an endpoint security policy based, in part, on the verified attributes.

12. A system for generating a software product component catalog for endpoint security comprising:

a processing circuitry;

a memory, the memory containing instructions that, when executed by the processing circuitry, configure the system to:

receive data on endpoint usage of software product components, wherein the data on endpoint usage includes information on states of the software product components;

invoke at least one (artificial intelligence) AI agent and external data sources based on the data on endpoint usage, wherein the external data sources are invokable by the at least one AI agent to extract particular types of attributes of the software product components;

extract, by the at least one AI agent using external data sources, attributes of the software product components, wherein attributes are dynamic qualities of a software product component;

when a software product component is an opaque software application installer, launch, by the at least one AI agent, an isolated virtual machine in which to execute the installer;

generate, by the at least one AI agent, a pre-installation snapshot of the isolated machine before the installer is executed;

execute, by the at least one AI agent, the installer in the isolated virtual machine;

generate, by the at least one AI agent, a post-installation snapshot of the isolated machine after the installer is executed;

record, by the at least one AI agent, changes in the isolated virtual machine, wherein the changes include at least files, file paths, hashes, types, and registry modifications;

verify the extracted attributes of the software product components using at least a language model, heuristics, and a combination thereof; and generate an endpoint security policy based, in part, on the verified attributes.

13. The system of claim 12, wherein the memory contains further instructions which when executed by the processing circuitry further configure the system to:

when a new type of attribute is requested, invoke at least one new AI agent configured to extract the new type of attribute.

14. The system of claim 12, wherein the memory contains further instructions which when executed by the processing circuitry further configure the system to:

when a new type of attribute is requested, add a new external data source invokable by the at least one AI agent, wherein the new external data source allows the at least one AI agent to extract the new type of attribute.

15. The system of claim 12, wherein a software product component is any one of:

a desktop application, mobile application, browser extension, a browser-based session, integrated development environment (IDE) plug-in, other software plug-in, command-line tool, portable application, background service, scheduled task, script, virtual appliance, containerized application, firmware utility, opaque software application installer, and running process.

16. The system of claim 12, wherein an attribute of a software product component is any one of:

CVEs, hashes of executables, file paths, registry entries, vendor homepage information, categories, known exploits, and backup behaviors.

17. The system of claim 12, wherein the memory contains further instructions that, when executed by the processing circuitry for verifying the extracted attributes of the software product components using at least a large language model (LLM) and heuristics, further configure the system to:

generate candidate matches for the extracted attributes;

prompt the language model with a prompt that includes at least the generated matches; and execute the prompt by the LLM to confirm the candidate matches are accurate.

18. The system of claim 12, wherein the memory contains further instructions which when executed by the processing circuitry further configure the system to:

invoke a plurality of AI agents to analyze each extracted attribute; and filter results of the analysis of the plurality of AI agents to include only attributes that are verified.

19. The system of claim 12, wherein an endpoint security policy defines at least access permissions for endpoint devices based on endpoint usage rules defined for at least software product components, user roles, and various usage contexts.

20. The system of claim 12, wherein the memory contains further instructions that, when executed by the processing circuitry for extracting, by the at least one AI agent using external data sources, attributes of the software product components, further configure the system to:

receive, by at least one AI agent, names of states of software product components in the data on endpoint usage; and determine, by the at least one AI agent using external data sources, when the received names of states are attributable to a same software product entity.

21. The system of claim 12, wherein the memory contains further instructions which when executed by the processing circuitry further configure the system to:

verify the extracted attributes based on the data on endpoint usage.

* * * * *